US009871934B2

(12) United States Patent
Takahashi et al.

(10) Patent No.: US 9,871,934 B2
(45) Date of Patent: Jan. 16, 2018

(54) IMAGE FORMING APPARATUS

(71) Applicant: CANON KABUSHIKI KAISHA, Tokyo (JP)

(72) Inventors: Keita Takahashi, Abiko (JP); Shinnosuke Iwadate, Toride (JP); Teruhito Kai, Kashiwa (JP); Hiroto Nishihara, Tsukuba (JP); Kenzo Kumagai, Toride (JP); Hiromi Shimura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 14/857,013

(22) Filed: Sep. 17, 2015

(65) Prior Publication Data

US 2016/0101954 A1 Apr. 14, 2016

(30) Foreign Application Priority Data

Oct. 8, 2014 (JP) .................................. 2014-207387

(51) Int. Cl.
*B65H 1/00* (2006.01)
*H04N 1/00* (2006.01)
(Continued)

(52) U.S. Cl.
CPC ......... *H04N 1/00482* (2013.01); *B65H 1/266* (2013.01); *B65H 7/02* (2013.01);
(Continued)

(58) Field of Classification Search
CPC . B65H 11/00; B65H 3/44; B65H 7/02; B65H 7/20; B65H 2511/52;
(Continued)

(56) References Cited

U.S. PATENT DOCUMENTS 4,796,035 A 1/1989 Kawasaki et al.
6,089,566 A * 7/2000 Xu ........................ B65H 29/12
271/171

(Continued)

FOREIGN PATENT DOCUMENTS

JP 2004-231410 8/2004
JP 2004-352440 * 12/2004
JP 2005-1825 * 1/2005

OTHER PUBLICATIONS

Machine translation of JP 2005-1825.*
Machine translation of JP 2004-352440.*

*Primary Examiner* — Thomas Morrison
(74) *Attorney, Agent, or Firm* — Fitzpatrick, Cella, Harper & Scinto

(57) ABSTRACT

Provided is an image forming apparatus, including: a manual feed tray on which a recording material is stacked; a first detecting unit; a second detecting unit arranged on an upstream side of the first detecting unit; a third detecting unit arranged on an upstream side of the second detecting unit; a fourth detecting unit detecting a length of the recording material; a display portion; and a control portion determining a size of the recording material based on detection results and causing the display portion to display a first screen displaying the determined size, wherein the control portion causes the display portion to display a second screen for designating the size, when, among the first to third detecting units, a detecting unit located on a downstream side does not detect presence of the recording material and another detecting unit located on an upstream side of the detecting unit, detects the presence.

9 Claims, 12 Drawing Sheets

(51) Int. Cl.
*B65H 1/26* (2006.01)
*B65H 7/02* (2006.01)

(52) U.S. Cl.
CPC ...... *B65H 2511/10* (2013.01); *B65H 2511/51* (2013.01); *B65H 2511/515* (2013.01); *B65H 2511/52* (2013.01); *B65H 2553/82* (2013.01); *H04N 2201/0094* (2013.01)

(58) Field of Classification Search
CPC .. B65H 2511/51; B65H 7/04; B65H 2511/12; B65H 2701/1131; B65H 1/00; B65H 2405/1116; B65H 2405/112; B65H 2405/113; B65H 2405/114; B65H 2511/10
See application file for complete search history.

(56) References Cited

U.S. PATENT DOCUMENTS

| | | |
|---|---|---|
| 6,311,039 B1 | 10/2001 | Funamizu et al. |
| 6,397,035 B2 | 5/2002 | Kataoka et al. |
| 6,651,980 B2 | 11/2003 | Isemura et al. |
| 8,180,234 B2 | 5/2012 | Takahashi et al. |
| 8,561,978 B2 | 10/2013 | Takahashi et al. |

\* cited by examiner

IMAGE FORMING APPARATUS

BACKGROUND OF THE INVENTION

Field of the Invention

The present invention relates to an image forming apparatus configured to form an image on a fed sheet.

Description of the Related Art

Hitherto, an image forming apparatus such as a copying machine or a printer includes a sheet feeding cassette in an apparatus main body so that copying or printing can be carried out for a sheet continuously. A size and a type of the sheet to be used greatly depend on an environment in which a user uses the image forming apparatus. To address such a requirement, the image forming apparatus is provided with a plurality of sheet feeding cassettes. Even when the image forming apparatus includes a plurality of sheet feeding cassettes, there may arise a demand to execute the copying or printing for a sheet different from the sheet set on each of the sheet feeding cassettes. On the assumption that there may arise such a demand, the image forming apparatus is configured as follows. Specifically, the image forming apparatus also includes a manual feed tray besides the sheet feeding cassettes so that a desired sheet can be set with ease.

In order to feed and convey the sheet set on the manual feed tray and form an image in an appropriate position, the size of the sheet needs to be known, and it is necessary for the user to input the size of the sheet through an operation portion. In this case, each time the user sets a sheet on the manual feed tray, the user needs to set the sheet size through the operation portion, and hence there has been a fear for a decrease in usability. In contrast, there has been proposed such a configuration that a plurality of sensors is arranged on the manual feed tray in a direction of conveying the sheet (Japanese Patent Application Laid-Open No. 2004-231410). A length of the sheet placed on the manual feed tray in the conveyance direction is detected by the plurality of sensors. Based on a value acquired from a volume sensor mounted to a movable guide on the manual feed tray, a length of the sheet in a direction orthogonal to the conveyance direction is detected. Based on the detection results, the image forming apparatus automatically detects the sheet size. In the image forming apparatus configured to automatically detect the sheet size, in order to further enhance operability of the user, the sheet size is determined without displaying a screen for checking the automatically detected sheet size on the operation portion.

The related-art image forming apparatus has the following problems. When a sensor arranged in the conveyance direction of the sheet fails, and a sheet to be subjected to copying or printing is set on the manual feed tray, the sheet size of the sheet set on the manual feed tray is erroneously detected. For example, a sensor arranged in the conveyance direction of the sheet for detecting a sheet having the size of an A3 length (420 mm) may fail and be stuck in an on state. In this case, even when the user sets a sheet having an A4 size (210 mm) on the manual feed tray, the image forming apparatus determines that the sheet size is the A3 length. As a result, the image forming is carried out so as to be suitable for the size of the A3 length. However, the fed sheet is the sheet having the A4 length, and hence the size of a formed image is larger than the size of the fed sheet. As a result, remaining toner that has not been transferred onto the sheet is adhered to members of an image forming portion, which causes an image failure such as marking back during image forming processing on the subsequent sheet.

The sensor arranged in the conveyance direction of the sheet may fail and be stuck in an off state. In this case, even when the user sets a sheet having the A3 size on the manual feed tray, the image forming apparatus determines that the sheet size is the A4 length. As a result, the sheet size determined by the image forming apparatus is smaller in length than the sheet size of the fed sheet in the conveyance direction, and it may be determined that a paper jam occurs.

SUMMARY OF THE INVENTION

The present invention has an object to prevent an image failure or a paper jam caused by an erroneous detection when a sheet size is detected by a manual feed tray.

In order to solve the above-mentioned problem, one embodiment of the present invention includes the following configuration.

There is provided an image forming apparatus, including: a manual feed tray on which a recording material is to be manually stacked; a first detecting unit configured to detect presence or absence of the recording material on the manual feed tray; a second detecting unit arranged on an upstream side of the first detecting unit in a conveyance direction of the recording material, the second detecting unit configured to detect presence or absence of the recording material on the manual feed tray; a third detecting unit arranged on an upstream side of the second detecting unit in the conveyance direction, the third detecting unit configured to detect presence or absence of the recording material on the manual feed tray; a fourth detecting unit configured to detect a length of the recording material on the manual feed tray in a direction orthogonal to the conveyance direction; a display portion configured to display information; and a control portion configured to determine a size of the recording material based on detection results of the first detecting unit, the second detecting unit, the third detecting unit and the fourth detecting unit, and control portion causing the display portion to display a first screen displaying the determined size of the recording material, wherein the control portion causes the display portion to display a second screen for designating the size of the recording material, when, among the first detecting unit, the second detecting unit and the third detecting unit, a detecting unit located on a downstream side in the conveyance direction does not detect the presence of the recording material and another detecting unit located on an upstream side of the detecting unit in the conveyance direction, which does not detect the presence of the recording material, detects the presence of the recording material.

According to the one embodiment of the present invention, it is possible to prevent the image failure or the paper jam caused by the erroneous detection when the sheet size is detected by the manual feed tray.

Further features of the present invention will become apparent from the following description of exemplary embodiments with reference to the attached drawings.

DESCRIPTION OF THE EMBODIMENTS

Now, embodiments of the present invention are described in detail with reference to the drawings.

First Embodiment

Image Forming Apparatus

Figure 1:
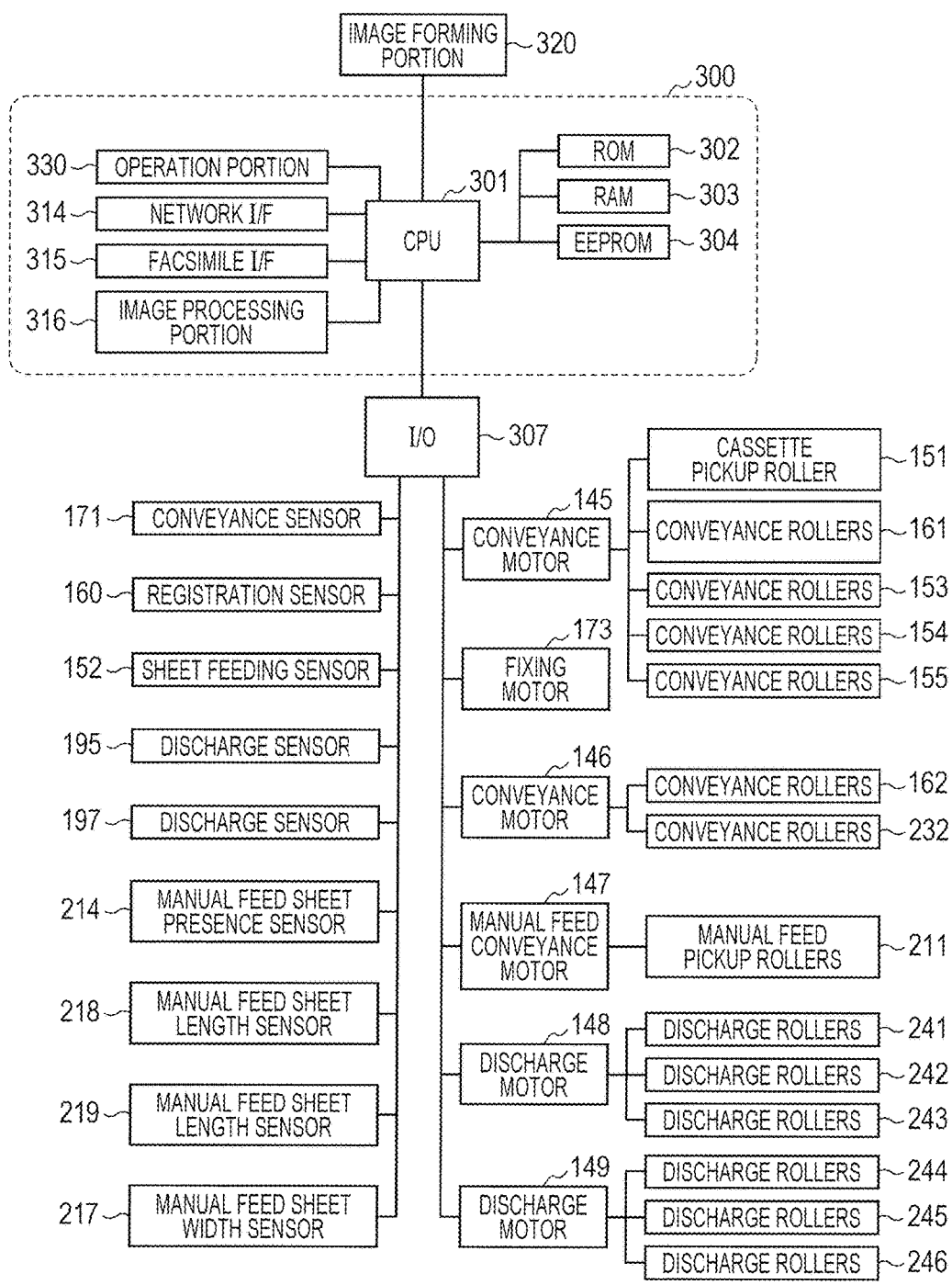
FIG. 1 is a system block diagram of an image forming apparatus according to a first embodiment and a second embodiment of the present invention.
Figure 2:
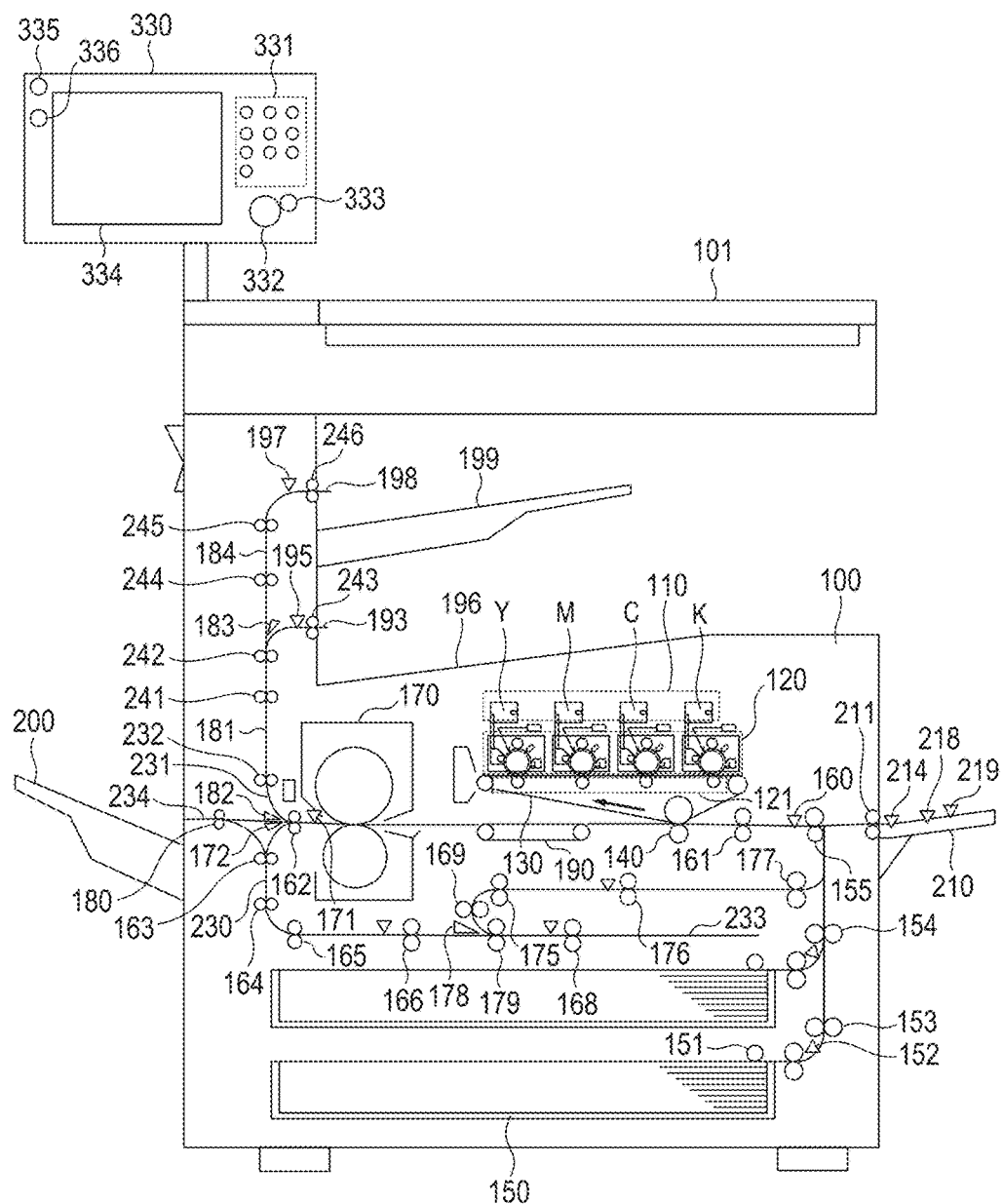
FIG. 2 is a view for illustrating a configuration of the image forming apparatus according to the first embodiment and the second embodiment.

FIG. 1 is a system block diagram of an image forming apparatus according to a first embodiment of the present invention, and FIG. 2 is a sectional view of an image forming apparatus 100 and a scanner portion 101 according to this embodiment. With reference to FIG. 1 and FIG. 2, a basic configuration is described. A control portion 300 illustrated in FIG. 1 includes a CPU 301, a ROM 302, a RAM 303, and an EEPROM 304. When, for example, an instruction (hereinafter referred to as "job") to start a printing operation is input to the CPU 301 through a user interface (UI) of an operation portion 330 (hereinafter referred to simply as "operation portion 330"), the CPU 301 starts the printing operation. The CPU 301 can drive and control, via an I/O 307, a conveyance motor 145, a fixing motor 173, a conveyance motor 146, a manual feed conveyance motor 147, a discharge motor 148, and a discharge motor 149. Further, the CPU 301 can detect, via the I/O 307, an input signal input from a conveyance sensor 171, a registration sensor 160, a sheet feeding sensor 152, a discharge sensor 195, or a discharge sensor 197.

Further, the CPU 301 can detect, via the I/O 307, an input signal input from a manual feed sheet presence sensor 214, a manual feed sheet length sensor 218, or a manual feed sheet length sensor 219. The sheet length represents a length of a sheet in a conveyance direction thereof. The CPU 301 can detect, via the I/O 307, an input signal input from a manual feed sheet width sensor 217. In addition, the CPU 301 can also receive a job input from a network I/F 314 or a facsimile I/F 315. For example, the CPU 301 is connected to a network for communicating to/from an external apparatus, and receives a job from the external apparatus via the network I/F 314. Further, for example, the CPU 301 is connected to a telephone line for receiving FAX, and receives FAX via the facsimile I/F 315.

The CPU 301 includes an image processing portion 316 configured to process an image corresponding to the job received from the operation portion 330 or the like, and executes image processing such as expansion and rotation of the image. Further, the CPU 301 can control an image forming portion 320. The image forming portion 320 can control drive and supply of a high voltage to a process unit 120 indicated by the dotted frame in FIG. 2, a transfer belt 130, a secondary transfer portion 140, and the like, and can control a laser scanner unit 110 indicated by the dotted frame in FIG. 2. Further, the image forming portion 320 can control a temperature of a heater of a fixing device 170 illustrated in FIG. 2. The scanner portion 101 carries out an operation for reading an original when copying is executed. The CPU 301 includes a timer, and carries out various types of timing control by using the timer to measure the time.

With reference to FIG. 1 and FIG. 2, a basic image forming operation is described. When receiving a job from the operation portion 330, the CPU 301 analyzes the received job, and starts a printing operation. The CPU 301 drives, via the I/O 307, the conveyance motor 145 serving as a drive source of a cassette pickup roller 151. Thereby, the cassette pickup roller 151 is driven to rotate and sheets within a sheet feeding cassette 150 are fed and conveyed one by one. At this time, the CPU 301 uses the sheet feeding sensor 152 to monitor whether or not a sheet feeding operation has been normally carried out for the sheets.

Sheet conveyance from the manual feed tray 210 is described. The CPU 301 operates as follows when receiving an instruction to convey a sheet on the manual feed tray 210 from the operation portion 330 with the sheets serving as recording materials being stacked on the manual feed tray 210. Specifically, the CPU 301 drives the manual feed conveyance motor 147 via the I/O 307 to rotate manual feed pickup rollers 211. When rotation of the manual feed pickup rollers 211 is started, the sheets on the manual feed tray 210 are fed and conveyed one by one. In the same manner as in the case of sheet feeding from the sheet feeding cassette 150, the CPU 301 monitors the registration sensor 160 to determine whether or not the sheet feeding operation has been normally carried out. Further, the manual feed sheet presence sensor 214 serving as a first detecting unit determines whether or not a sheet is set on the manual feed tray 210. A configuration of the manual feed tray 210 is described later in detail.

The CPU 301 causes the process unit 120 to start the image forming operation so as to be in time with arrival of the sheet at the secondary transfer portion 140. The process unit 120 includes a photosensitive drum, a developing device, a charging roller, and a photosensitive drum cleaner. In the process unit 120, after a surface of the photosensitive drum is charged, an electrostatic latent image is formed on the photosensitive drum by a laser beam emitted from the laser scanner unit 110. The electrostatic latent image formed on the photosensitive drum is developed on the photosensitive drum by the toner within the developing device, and becomes a toner image. After that, the toner image formed on the photosensitive drum is applied with a primary transfer voltage in a primary transfer portion 121 (illustrated by the dotted frame), and the toner image is transferred onto the transfer belt 130. The toner image transferred onto the transfer belt 130 is conveyed to the secondary transfer portion 140 by rotation of the transfer belt 130.

Further, the CPU 301 monitors the registration sensor 160 to detect a position of the sheet conveyed by conveyance rollers 153, conveyance rollers 154, and conveyance rollers 155. Then, in consideration of a timing at which a leading edge of the sheet reaches the registration sensor 160, the CPU 301 controls the conveyance of the sheet so that the leading edge of the sheet and the leading edge of the toner image on the transfer belt 130 are aligned with each other at the secondary transfer portion 140. For example, when the sheet has reached the registration sensor 160 earlier than the toner image, the CPU 301 stops the sheet for a predetermined period of time at conveyance rollers 161 and restarts the conveyance of the sheet thereafter. In the secondary transfer portion 140, the CPU 301 applies a secondary transfer voltage to the sheet and the toner image that have reached the secondary transfer portion 140, to thereby transfer the toner image onto the sheet.

The sheet having the toner image transferred thereon is conveyed to the fixing device 170 via a conveyor belt 190. In the fixing device 170, the unfixed toner image that has transferred onto the sheet is heated and fixed to the sheet. After that, the sheet is further conveyed to a downstream-side part in the conveyance direction of the sheet. When the leading edge of the sheet subjected to the fixing reaches the conveyance sensor 171, the CPU 301 carries out the following operation. Specifically, the CPU 301 determines, based on contents of the job designated through the operation portion 330 in advance, which conveyance path of a sheet conveyance path 230, a sheet conveyance path 231, and a sheet conveyance path 234 the sheet is to be conveyed by conveyance rollers 162. The CPU 301 switches a conveyance destination of the sheet by switching a conveyance flapper 172 and a conveyance flapper 182.

Specifically, when the job designated through the operation portion 330 is a double-sided print job, and when the sheet is to be discharged with the printed surface facing down with respect to a discharge port 200, the CPU 301 switches the conveyance flapper 172 in order to convey the sheet to the sheet conveyance path 230. Further, when the sheet is to be discharged onto a discharge port 196 or a discharge port 199 at a time of one-sided printing or double-sided printing, the CPU 301 conveys the sheet to the sheet conveyance path 231 by switching the conveyance flapper 182. In addition, when the job designated through the operation portion 330 is a discharge instruction with respect to the discharge port 200, the CPU 301 conveys the sheet to the sheet conveyance path 234 by switching the conveyance flapper 172 and the conveyance flapper 182.

The sheet conveyed to the sheet conveyance path 231 is further conveyed to a downstream side in the conveyance direction of the sheet (hereinafter referred to as "downstream side") by conveyance rollers 232. Subsequently, the sheet is conveyed to a sheet conveyance path 181, and conveyed toward the discharge port 196 and the discharge port 199. The sheet conveyed to the sheet conveyance path 181 is conveyed by discharge rollers 241 and discharge rollers 242 driven by the discharge motor 148. When the job designated through the operation portion 330 is a discharge instruction with respect to the discharge port 196, the CPU 301 conveys the sheet to a conveyance path 193 by switching a flapper 183, to thereby discharge the sheet onto the discharge port 196 by discharge rollers 243. When the job designated through the operation portion 330 is a discharge instruction with respect to the discharge port 199, the CPU 301 switches the flapper 183 toward a conveyance path 184. Subsequently, the CPU 301 conveys the sheet to a conveyance path 198 by discharge rollers 244, discharge rollers 245, and discharge rollers 246 that are driven by the discharge motor 149, to thereby discharge the sheet onto the discharge port 199.

When the sheet is discharged onto the discharge port 200 with the printed surface facing down at the time of carrying out the one-sided printing, the CPU 301 conveys the sheet to the sheet conveyance path 230. Then, at a timing at which a trailing edge of the sheet passes through reversal rollers 163, the rollers such as the reversal rollers 163 and double-sided conveyance rollers 164 are driven to reversely rotate so that the sheet is conveyed toward discharge rollers 180, to thereby the sheet is discharged onto the discharge port 200. When performing the double-sided printing, the sheet is conveyed to the sheet conveyance path 230. Then, the sheet is conveyed to a double-sided turnover conveyance path 233 by the double-sided conveyance rollers 164, 165, 166, 179, and 168. Subsequently, at a timing at which the trailing edge of the sheet passes through the double-sided conveyance rollers 179, a double-sided turnover flapper 178 is switched toward double-sided conveyance rollers 169, and the rollers such as the double-sided conveyance rollers 168 and 179 are driven to reversely rotate. Subsequently, the sheet is conveyed by the double-sided conveyance rollers 169, 175, 176, and 177, to be passed to the conveyance rollers 155. After all the jobs are finished, the CPU 301 displays on the operation portion 330 that the jobs have been finished.

The operation portion 330 includes an input key group 331 (illustrated by the dotted frame) to be used when a user inputs information, and a start key 332 to be depressed when the image forming operation is started. Further, the operation portion 330 includes a stop key 333 to be depressed when the image forming operation or the like is interrupted, a display portion 334 serving as a display unit, and a sleep button 335. The sleep button 335 of the operation portion 330 is depressed when shifting to a sleep mode in which the image forming apparatus 100 is in a power saving state to reduce power consumption. Moreover, the sleep button 335 is depressed when the image forming apparatus 100 recovers from the sleep mode. A user setting button 336 is depressed when a screen for displaying a screen setting screen 1200 (refer to FIG. 11) is displayed on the display portion 334. The basic image forming operation is merely an example, and the present invention is not limited to the above-mentioned configuration.

Manual Feed Tray

Figure 3A:
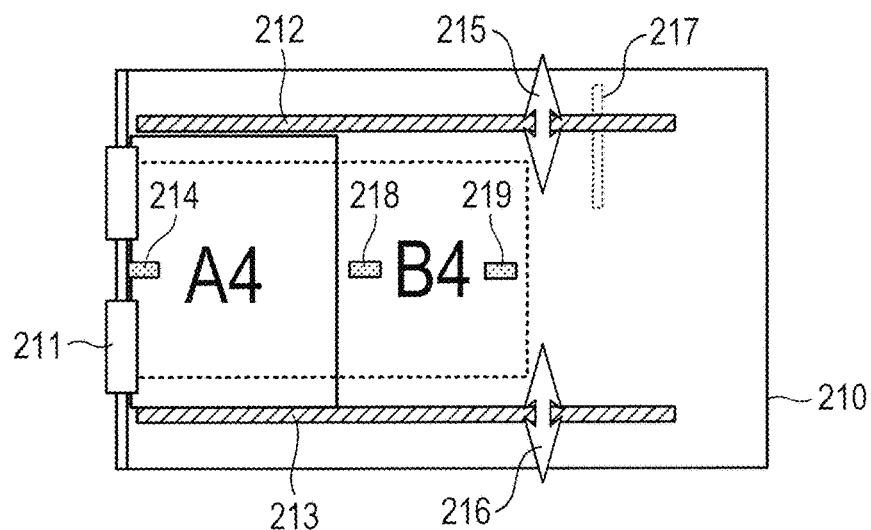
FIG. 3A is a top view of a manual feed tray according to the first embodiment and the second embodiment.

FIG. 3A is a top view of the manual feed tray 210, and a main body of the image forming apparatus 100 is located on the left side of FIG. 3A. When a bundle of sheets (hereinafter sometimes referred to simply as "sheets") is set on the manual feed tray 210, the sheets are separated from the bundle of sheets one by one by the manual feed pickup rollers 211, to be conveyed. When the sheets are set on the manual feed tray 210, the manual feed sheet presence sensor 214 outputs the ON signal. An ON signal is input from the manual feed sheet presence sensor 214 to the CPU 301, and the CPU 301 determines that the sheet is present on the manual feed tray 210. The bundle of sheets set on the manual feed tray 210 is sandwiched at both end portions of the bundle of sheets in the conveyance direction of the sheet by side-regulating guides 212 and 213 serving as regulating plates. This prevents the sheet from being skew fed and conveyed while the sheet is conveyed by the manual feed pickup rollers 211. By causing the side-regulating guides 212 and 213 to slide in directions indicated by arrows 215 and 216 in FIG. 3A, it is possible to prevent the sheet from being skew fed even when the sheet having an arbitrary sheet width is set. The sheet width represents the length of the sheet in a direction orthogonal to the conveyance direction. In addition, the side-regulating guides 212 and 213 are coupled to each other through the manual feed sheet width sensor 217 serving as a fourth detecting unit and a link member (not shown). The manual feed sheet width sensor 217 outputs a signal (AD value) corresponding to positions of the side-regulating guides 212 and 213 to the CPU 301 in conjunction with operations of the side-regulating guides 212 and 213.

The CPU 301 detects the sheet width based on the signal (AD value) input from the manual feed sheet width sensor 217. The manual feed sheet length sensor 218 serving as a second detecting unit and the manual feed sheet length sensor 219 serving as a third detecting sensor are, for example, flag-type sensors, and detect the length of the sheet set on the manual feed tray 210 (refer to FIG. 7). The sheet length represents the length of the sheet in the conveyance direction. The flag-type sensors include, for example, flags 218a and 219a and photointerrupters 218b and 219b (refer to FIG. 7). When the sheet is stacked on the manual feed tray 210, the sheet abuts against the flag, the flag consequently turns, and the flag brings the photointerrupter into a light shielding state. For example, in this embodiment, when the photointerrupter is in the light shielding state, the manual feed sheet length sensors 218 and 219 output ON signals. When a sheet is not stacked on the manual feed tray 210, the flags do not turn, and the flags do not shield the light, and the photointerrupters are in a light transmission state. For example, in this embodiment, when the photointerrupters are in the light transmission state, the manual feed sheet length sensors 218 and 219 output OFF signals. In this embodiment, the manual feed sheet presence sensor 214 also includes a flag 214a and a photointerrupter 214b (refer to FIG. 7), but the manual feed sheet presence sensor 214 may be a sensor of another type.

Sheet Size Detection

Figure 3B:
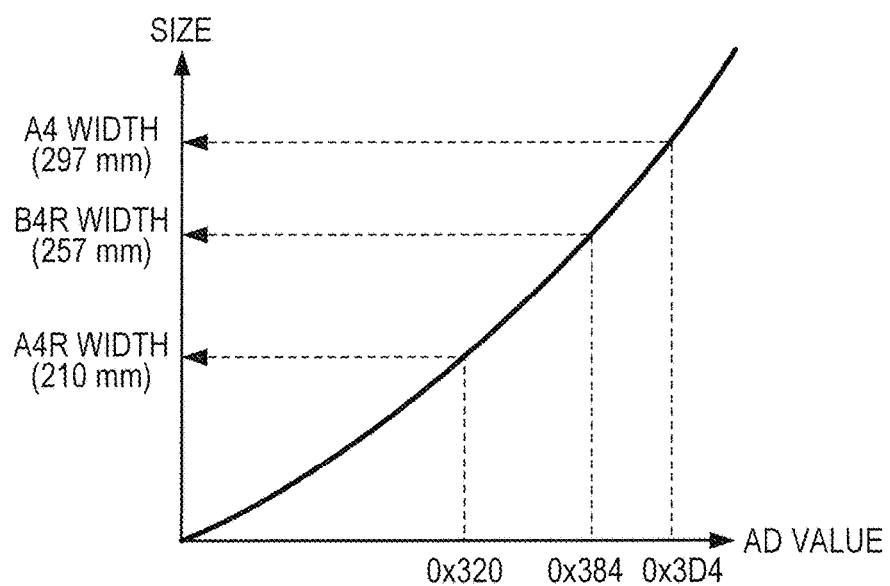
FIG. 3B is a graph for showing a relationship between an AD value and a sheet size.

With reference to FIG. 3B and Table 1, a method of detecting a size of the sheet set on the manual feed tray 210 is described. FIG. 3B is a graph for showing a relationship between the signal (AD value) output from the manual feed sheet width sensor 217 based on the positions of the side-regulating guides 212 and 213 and a width of the sheet to be detected in actuality (paper width). Specifically, in FIG. 3B, the horizontal axis indicates the AD value (such as 0x3D4) output by the manual feed sheet width sensor 217, while the vertical axis indicates the size of the sheet (paper width) (such as A4 width (297 mm)). The manual feed sheet width sensor 217 is a sensor configured to output, specifically, a 10-bit digital value and to output, substantially linearly, output values 0x000 to 0x400 in the hexadecimal format.

As shown in FIG. 3B, the output value 0x320 of the manual feed sheet width sensor 217 represents 210 mm as the A4R width, the output value 0x384 similarly represents 257 mm as the B4R width, and the output value 0x3D4 represents 297 mm as the A4 width. In other words, for example, when the AD value 0x320 is input from the manual feed sheet width sensor 217, the CPU 301 determines that the paper width of the sheet set on the manual feed tray 210 is 210 mm. The CPU 301 detects the sheet width from the output value (AD value) of the manual feed sheet width sensor 217, and detects the sheet length from the output values of the manual feed sheet length sensors 218 and 219.

Then, the CPU 301 refers to Table 1 to determine the size of the sheet from those detection results.

TABLE 1

| Size | Sheet width | Sheet length | Manual feed sheet presence sensor 214 | Manual feed sheet length sensor 218 | Manual feed sheet length sensor 219 | Manual feed sheet width sensor 217 |
|---|---|---|---|---|---|---|
| A5  | 210 | 148 | ON | OFF | OFF | 0 × 320 ± 0 × 10 |
| B5  | 257 | 182 | ON | OFF | OFF | 0 × 384 ± 0 × 10 |
| A4  | 297 | 210 | ON | OFF | OFF | 0 × 3D4 ± 0 × 10 |
| A5R | 148 | 210 | ON | OFF | OFF | 0 × 258 ± 0 × 10 |
| B5R | 182 | 257 | ON | ON  | OFF | 0 × 2E4 ± 0 × 10 |
| A4R | 210 | 297 | ON | ON  | OFF | 0 × 320 ± 0 × 10 |
| B4  | 257 | 364 | ON | ON  | ON  | 0 × 384 ± 0 × 10 |
| A3  | 297 | 420 | ON | ON  | ON  | 0 × 3D4 ± 0 × 10 |

Table 1 shows the size of the sheet, the sheet width (mm), and the sheet length (mm) from the left in this order, and shows the information in which the sizes of the sheet are associated with the detection results obtained by the respective sensors. In addition, Table 1 shows the detection result from the manual feed sheet presence sensor 214, the detection results from the manual feed sheet length sensors 218 and 219, and the detection result from the manual feed sheet width sensor 217. The manual feed sheet width sensor 217 outputs the AD value to the CPU 301, and the other sensors output an ON signal or an OFF signal to the CPU 301.

The CPU 301 refers to those detection results from the sensors and Table 1, to thereby determine the size of the sheet. In other words, the CPU 301 functions as a determination unit configured to determine the size of the sheet. For example, it is assumed that the manual feed sheet presence sensor 214 outputs the ON signal, the manual feed sheet length sensor 218 outputs the OFF signal, the manual feed sheet length sensor 219 outputs the OFF signal, and the manual feed sheet width sensor 217 outputs the AD value 0x320±0x10. In this case, the CPU 301 determines that the sheet set on the manual feed tray 210 is an A5-size sheet based on the detection results from the respective sensors and the information of Table 1. In the same manner, it is assumed that the manual feed sheet presence sensor 214 outputs the ON signal, the manual feed sheet length sensor 218 outputs the ON signal, the manual feed sheet length sensor 219 outputs the OFF signal, and the manual feed sheet width sensor 217 outputs the AD value 0x320±0x10. In this case, the CPU 301 determines that the sheet set on the manual feed tray 210 is an A4R-size sheet to be fed by a short edge feed of A4.

As shown in Table 1, even when the output value of the manual feed sheet width sensor 217 is the same, it is possible to determine that the size is different based on a difference in the detection results from the manual feed sheet length sensors 218 and 219. For example, even when the output value of the manual feed sheet width sensor 217 is the same AD value 0x320±0x10, the size of the sheet can be distinguished between A5 and A4R based on the detection results from the manual feed sheet length sensors 218 and 219.

Even when the detection results from the manual feed sheet length sensors 218 and 219 are the same, the sheet size is distinguished as long as the output value of the manual feed sheet width sensor 217 is different. For example, even when the detection results from the manual feed sheet length sensors 218 and 219 are OFF, the CPU 301 can make the following determination based on the AD value of the manual feed sheet width sensor 217. For example, the size of the sheet is determined as A5, B5, A4, and A5R when the AD value of the manual feed sheet width sensor 217 is 0x320±0x10, 0x384±0x10, 0x3D4±0x10, and 0x258±0x10, respectively.

Manual Feed Sheet Size Display Screen

Figure 4A:
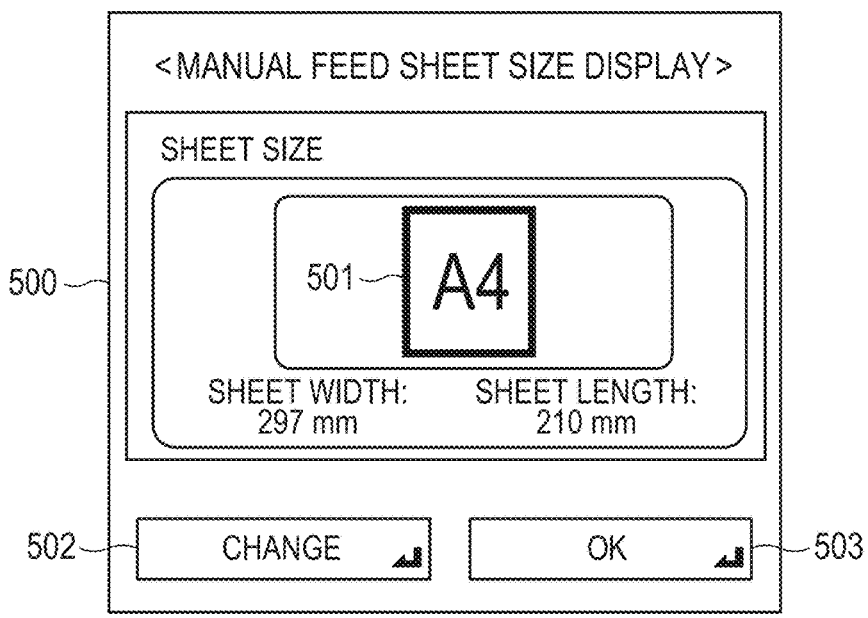
FIG. 4A is a diagram for illustrating a manual feed sheet size display screen according to the first embodiment.
Figure 4B:
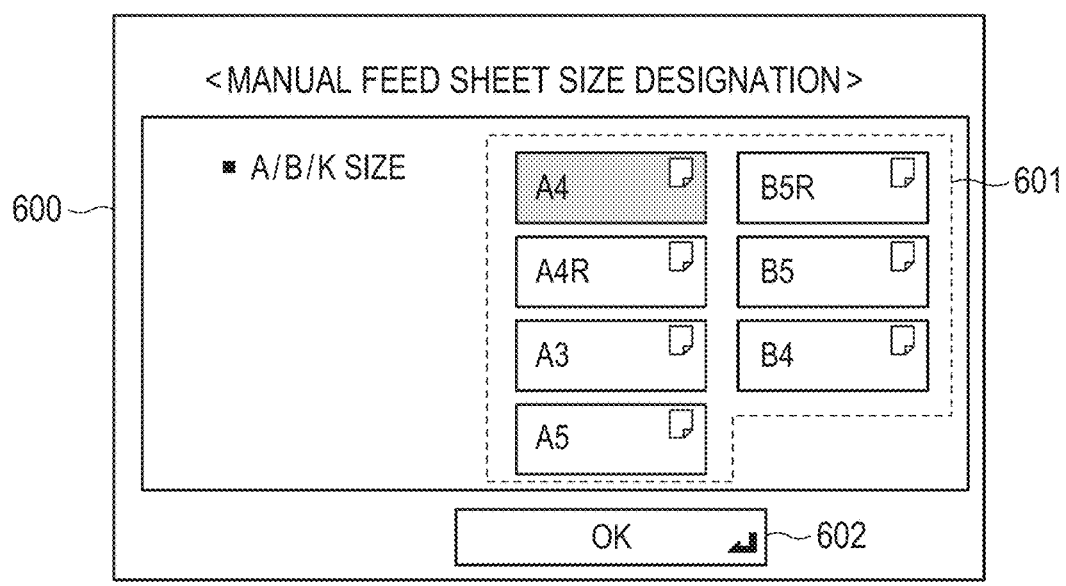
FIG. 4B is a diagram for illustrating a manual feed sheet size designation screen.

With reference to FIG. 4A and FIG. 4B, a screen displayed on the operation portion 330 in order to prompt the user to check the sheet size set on the manual feed tray 210 and designate the sheet size is described. FIG. 4A is a manual feed sheet size display screen 500, which is a first screen displayed on the display portion 334 of the operation portion 330. The manual feed sheet size display screen 500 of FIG. 4A is displayed on the display portion 334 of the operation portion 330 in response to a state in which the sheet is set on the manual feed tray 210, and the sheet size is determined by the CPU 301. For example, in a process of S708 of FIG. 5 or a process of S909 of FIG. 8, the CPU 301 displays the manual feed sheet size display screen 500 on the display portion 334 of the operation portion 330.

Figure 5:
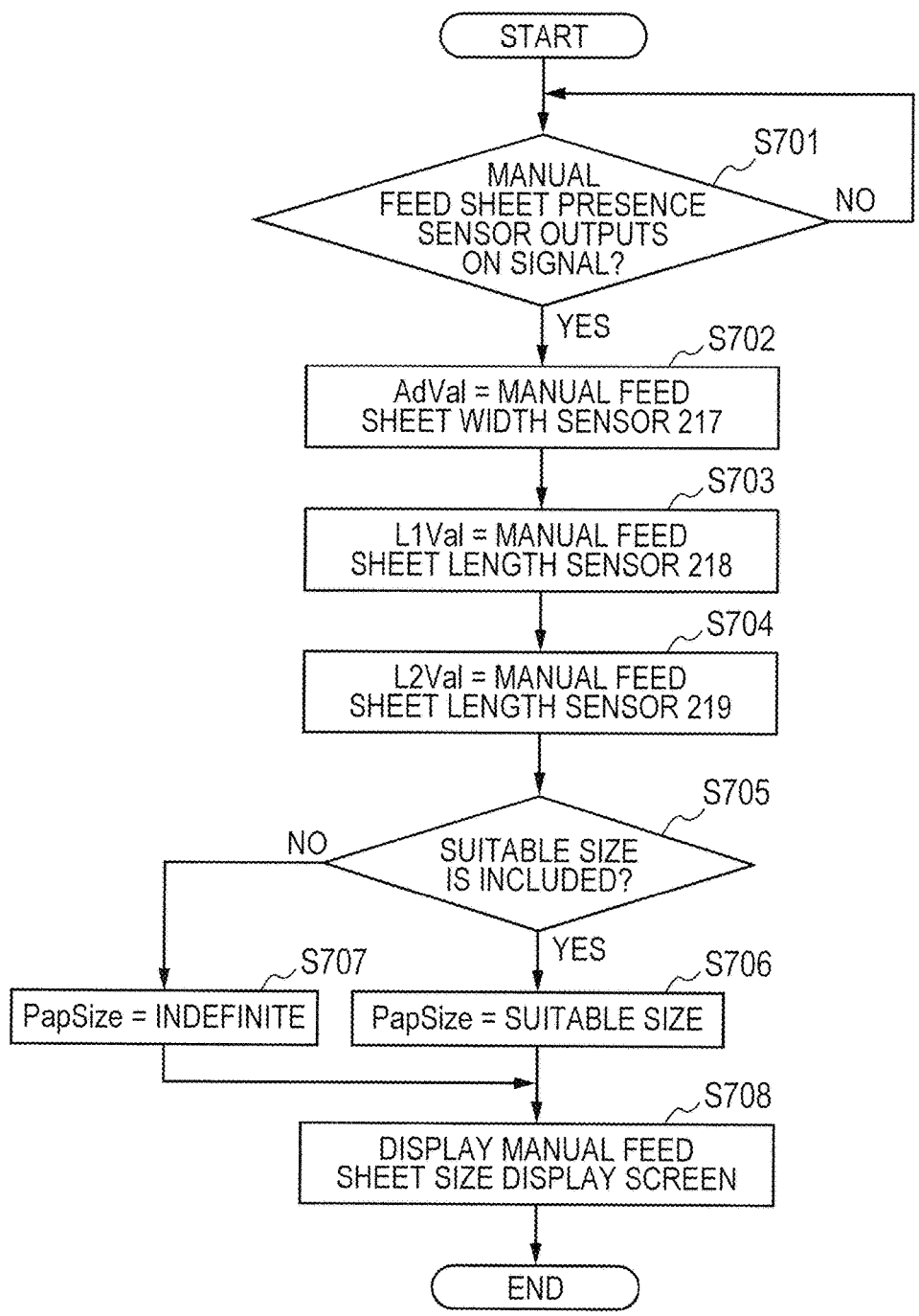
FIG. 5 is a flowchart for displaying the manual feed sheet size display screen according to the first embodiment.
Figure 8:
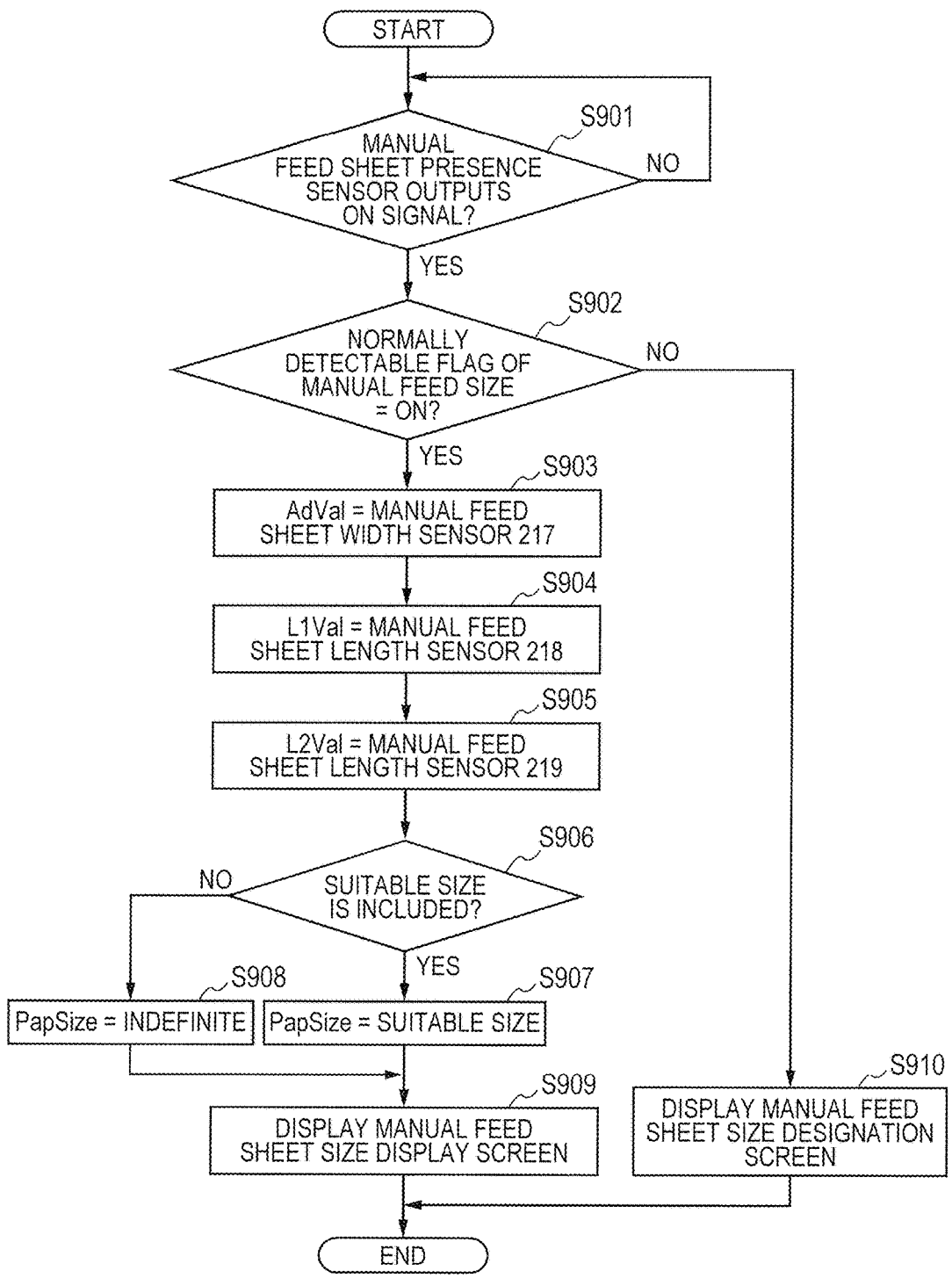
FIG. 8 is a flowchart for illustrating a display screen switching operation according to the first embodiment.

Specifically, the CPU 301 determines the size of the sheet set on the manual feed tray 210, and displays the determined size of the sheet on the display portion 334. In this manner, the display screen 500 prompts the user to check the size of the sheet set on the manual feed tray 210. Referring to FIG. 5 and FIG. 8, a method of detecting the size of the sheet set on the manual feed tray 210 is described later. When the size of the sheet set on the manual feed tray 210 matches a displayed size 501 displayed on the manual feed sheet size display screen 500, an OK button 503 is depressed. When the size of the sheet set on the manual feed tray 210 does not match the displayed size 501 displayed on the manual feed sheet size display screen 500, a change button 502 is depressed.

Manual Feed Sheet Size Designation Screen

FIG. 4B is a manual feed sheet size designation screen 600, which is a second screen displayed on the display portion 334 of the operation portion 330. The manual feed sheet designation screen 600 is displayed on the operation portion 330 when an arbitrary size of the sheet is designated by the user. For example, the manual feed sheet size designation screen 600 is displayed when the change button 502 is depressed on the manual feed sheet size display screen 500 of FIG. 4A. Moreover, when the size of the sheet cannot be determined by the respective sensors of the manual feed tray 210 (S910 of FIG. 8), the manual feed sheet size designation screen 600 is also displayed on the operation portion 330. When the manual feed sheet size designation screen 600 is displayed on the display portion 334 of the operation portion 330, the size of the sheet is selected by the user depressing any of the buttons of the size designation buttons 601 (indicated by the broken-line frame). In FIG. 4B, as an example, the A4 size is designated. After the sheet size is selected, the sheet size of the sheet set on the manual feed tray 210 is determined when the user depresses the OK button 602. The image forming apparatus 100 carries out a subsequent image forming operation based on the sheet size designated through the manual feed sheet size designation screen 600. The sheet size designated through the sheet size designation screen 600 is stored, for example, in the RAM 303.

Processing from Setting of Sheet to Displaying of Manual Feed Sheet Size Display Screen FIG. 5 is a basic flowchart for illustrating processing from setting of the sheet on the manual feed tray 210 to displaying of the manual feed sheet size display screen 500 on the operation portion 330. This processing is generally carried out. In order to compare the general processing of FIG. 5 with the processing of FIG. 8 according to this embodiment, the general processing of FIG. 5 is first described. In S701 (a step is indicated as "S"), the CPU 301 determines whether or not the manual feed sheet presence sensor 214 outputs the ON signal. While the CPU 301 is operating, the CPU 301 always monitors the output (ON or OFF) of the manual feed sheet presence sensor 214, and the same holds true for FIG. 6 and FIG. 8.

In S701, when the CPU 301 determines that the manual feed sheet presence sensor 214 outputs the OFF signal, the CPU 301 repeats the processing of S701. In S701, when the CPU 301 determines that the manual feed sheet presence sensor 214 outputs the ON signal, the processing proceeds to S702. In S702, the CPU 301 stores the output value of the manual feed sheet width sensor 217 as a variable AdVal (AdVal=output value of manual feed sheet width sensor 217). The variable AdVal is a variable for storing a value to be stored in the RAM 303. In S703, the CPU 301 stores the output value of the manual feed sheet length sensor 218 as a variable L1Val (L1Val=output value of manual feed sheet length sensor 218). In S704, the CPU 301 stores the output value of the manual feed sheet length sensor 219 as a variable L2Val (L2Val=output value of manual feed sheet length sensor 219). Each of L1Val and L2Val is a variable for storing a value to be stored in the RAM 303. In the following description, the variable for storing the value to be stored in the RAM 303 is referred to simply as "variable of the RAM 303".

In S705, the CPU 301 compares the respective values stored as the variables in the RAM 303 in the processing of S702 to S704 with Table 1 to determine whether or not Table 1 includes a suitable size. When the CPU 301 determines that Table 1 includes a suitable size in S705, the CPU 301 stores information (such as A5) of the suitable size as PapSize serving as the variable in the RAM 303 (PapSize=suitable size) in S706. When the CPU 301 determines that Table 1 does not include a suitable size in S705, the CPU 301 stores information (for example, "indefinite") indicating that the size is indefinite as the variable PapSize (PapSize=indefinite) in S707.

In S708, based on the information of the size of the sheet stored as the variable PapSize in S706 or S707, the CPU 301 displays the manual feed sheet size display screen 500 on the display portion 334 of the operation portion 330, and brings the processing to an end. In other words, based on the information of the size of the sheet stored as the variable PapSize in S706 or S707, the manual feed sheet size display screen 500 described with reference to FIG. 4A is displayed on the display portion 334 of the operation portion 330. Specifically, the CPU 301 displays the information (such as "A4") of the size of the sheet, which is stored as the variable PapSize in S706, on the displayed size 501 of the manual feed sheet size display screen 500. Alternatively, the CPU 301 displays the information (such as "indefinite") indicating that the size of the sheet is indefinite, which is stored as the variable PapSize in S707, on the displayed size 501 of the manual feed sheet size display screen 500.

Figure 6:
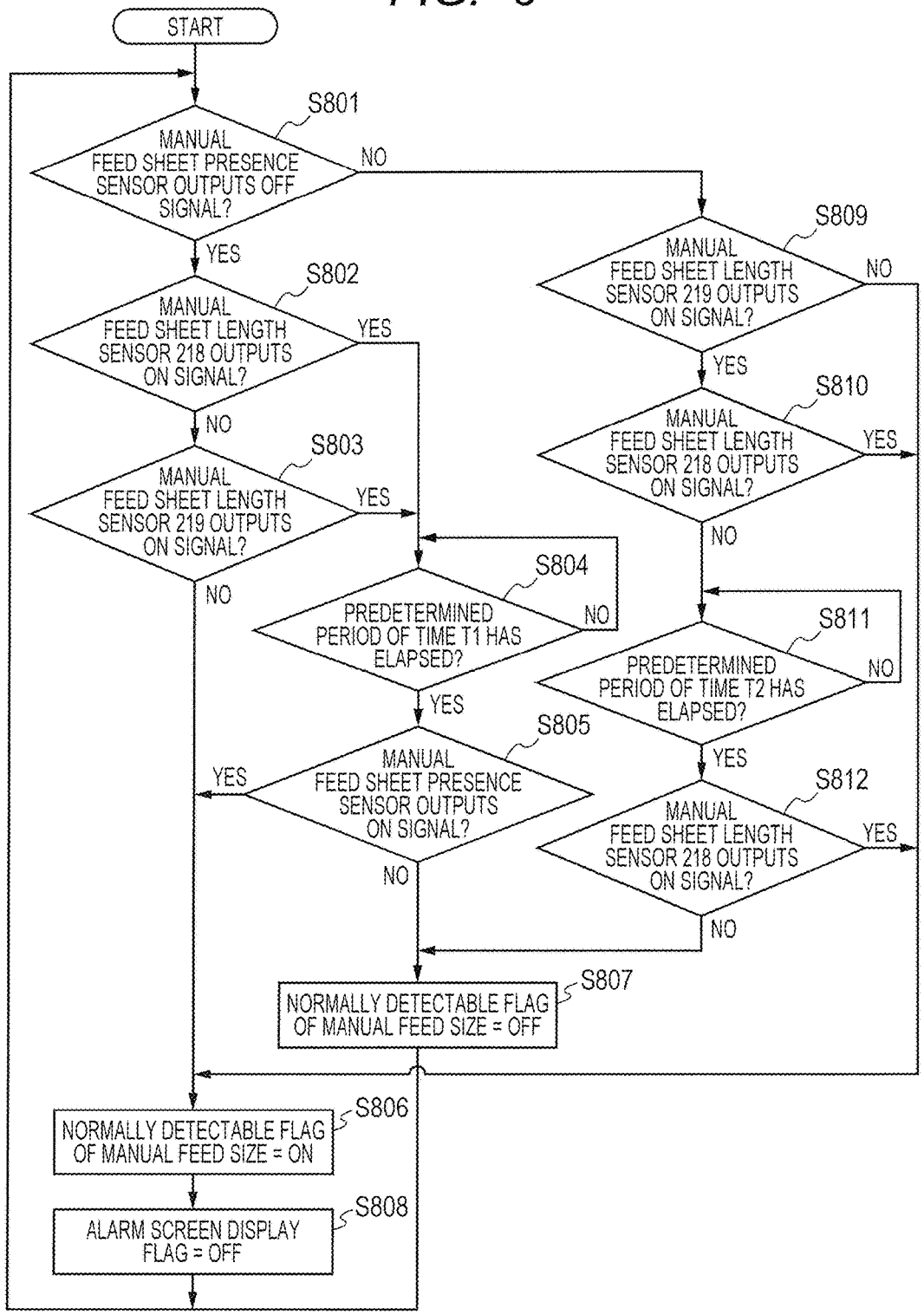
FIG. 6 is a flowchart for determining a normal operation of size detection according to the first embodiment.

Processing of Determining Whether or not Detection of Sheet Size by Manual Feed Tray is Normal FIG. 6 is a flowchart for determining whether or not the processing of detecting the size of the sheet set on the manual feed tray 210 can be normally carried out. In this embodiment, when the sheet is set on the manual feed tray 210, the processing illustrated in FIG. 6 is carried out. In S801, the CPU 301 determines whether or not the manual feed sheet presence sensor 214 outputs the OFF signal. Moreover, the CPU 301 resets and starts the timer. In S801, when the CPU 301 determines that the manual feed sheet presence sensor 214 outputs the OFF signal, the processing proceeds to S802. In S802, the CPU 301 determines whether or not the manual feed sheet length sensor 218 outputs the ON signal. When the CPU 301 determines that the manual feed sheet length sensor 218 outputs the ON signal, the processing proceeds to S804. In S802, when the CPU 301 determines that the manual feed sheet presence sensor 218 outputs the OFF signal, the processing proceeds to S803. In S803, the CPU 301 determines whether or not the manual feed sheet length sensor 219 outputs the ON signal. When the CPU 301 determines that the manual feed sheet length sensor 218 outputs the ON signal, the processing proceeds to S804. In S803, when the CPU 301 determines that the manual feed sheet presence sensor 219 outputs the OFF signal, the processing proceeds to S806. In this case, none of the sensors arranged on the manual feed tray 210 in the conveyance direction of the sheet detects the presence of the sheet, and the CPU 301 determines that the size detection for the sheet is normal.

In S804, by referring to the timer, the CPU 301 determines whether or not a predetermined period of time T1 has elapsed. When the CPU 301 determines that the predetermined period of time T1 has not elapsed, the CPU 301 repeats the processing of S804. In S804, when the CPU 301 determines that the predetermined period of time T1 has elapsed, the processing proceeds to S805. In S805, the CPU 301 again determines whether or not the manual feed sheet presence sensor 214 outputs the ON signal. When the CPU 301 determines that the manual feed sheet presence sensor 214 outputs the ON signal, the processing proceeds to S806. In this case, among the sensors arranged on the manual feed tray 210 in the conveyance direction of the sheet, there is no sensor in the OFF state and arranged on the downstream side in the conveyance direction with respect to a sensor in the ON state. Therefore, the CPU 301 determines that the size detection for the sheet is normal. In S805, when the CPU 301 determines that the manual feed sheet presence sensor 214 outputs the OFF signal, the processing proceeds to S807. In other words, when the manual feed sheet presence sensor 214 outputs the OFF signal in S801, and still outputs the OFF signal after the predetermined period of time T1 has elapsed, the processing proceeds to S807.

In S807, the CPU 301 sets a normally detectable flag of the manual feed size, which is a variable in the RAM 303, to OFF (the normally detectable flag of the manual feed size=OFF), and the processing returns to S801. The CPU 301 determines that the detection of the sheet size by the sensors arranged on the manual feed tray 210 cannot be normally carried out. In this state, despite the fact that the manual feed sheet presence sensor 214 outputs the OFF signal, namely the sheet is not set on the manual feed tray 210, at least one of the manual feed sheet length sensors 218 and 219 outputs the ON signal. In this case, the sensor arranged on the manual feed tray 210 cannot normally detect the size of the sheet. In this embodiment, when the sensor located on the downstream side in the conveyance direction of the sheet does not detect the presence of the sheet, and the sensor located on the upstream side of the sensor, which does not detect the presence of the sheet, in the conveyance direction detects the presence of the sheet, the following operation is carried out. Specifically, the CPU 301 determines that the size of the sheet cannot be determined by the plurality of sensors arranged on the manual feed tray 210.

The reason for the processing of S804 in which the CPU 301 waits until the predetermined period of time T1 elapses is described below. There is a conceivable state in which, in the course of the setting of the sheet on the manual feed tray 210 by the user, the manual feed sheet presence sensor 214 outputs the OFF signal, and at least one of the manual feed sheet length sensors 218 and 219 outputs the ON signal. The transient state of the detection result of the sensors generated in the course of the setting of the sheet on the manual feed tray 210 cannot be determined as the abnormality of the sensors. Therefore, in S804, the CPU 301 waits until the predetermined period of time T1 elapses. In this embodiment, the predetermined period of time T1 is, for example, 3 seconds.

In S806, the CPU 301 sets the normally detectable flag of the manual feed size, which is the variable in the RAM 303, to ON (the normally detectable flag of the manual feed size=ON). This is because the size of the sheet can be determined by the plurality of sensors arranged on the manual feed tray 210 when the processing proceeds to S806. In S808, the CPU 301 sets an alarm screen display flag, which is the variable in the RAM 803, to OFF (alarm screen display flag=OFF), and the processing returns to S801. The alarm screen display flag is described later in a second embodiment of the present invention.

In S801, when the CPU 301 determines that the manual feed sheet presence sensor 214 outputs the ON signal, the processing proceeds to S809. In S809, the CPU 301 determines whether or not the manual feed sheet length sensor 219 outputs the ON signal. In S809, when the CPU 301 determines that the manual feed sheet length sensor 219 outputs the OFF signal, the processing proceeds to S806. In this way, when the sensor located on the downstream side in the conveyance direction of the sheet detects the presence of the sheet, and the sensor located on the upstream side of the sensor, which detects the presence of the sheet, in the conveyance direction of the sheet does not detect the presence of the sheet, the CPU 301 determines that the size detection for the sheet is normal. Moreover, when all of the sensors arranged on the manual feed tray 210 in the conveyance direction of the sheet detect the presence of the sheet, the CPU 301 determines that the size detection for the sheet is normal.

In S809, when the CPU 301 determines that the manual feed sheet presence sensor 219 outputs the ON signal, the processing proceeds to S810. In S810, the CPU 301 determines whether or not the manual feed sheet length sensor 218 outputs the ON signal. When the CPU 301 determines that the manual feed sheet length sensor 218 outputs the ON signal, the processing proceeds to S806. In S810, when the CPU 301 determines that the manual feed sheet length sensor 218 outputs the OFF signal, the processing proceeds to S811. In this case, as described with reference to FIG. 3A, among the respective sensors arranged on the manual feed tray 210, the manual feed sheet presence sensor 214 and the manual feed sheet length sensor 219 arranged on the both sides of the manual feed tray 210 in the conveyance direction output the ON signals. The manual feed sheet length sensor 218 arranged on the center side of the manual feed tray 210 in the conveyance direction outputs the OFF signal.

Figure 7:
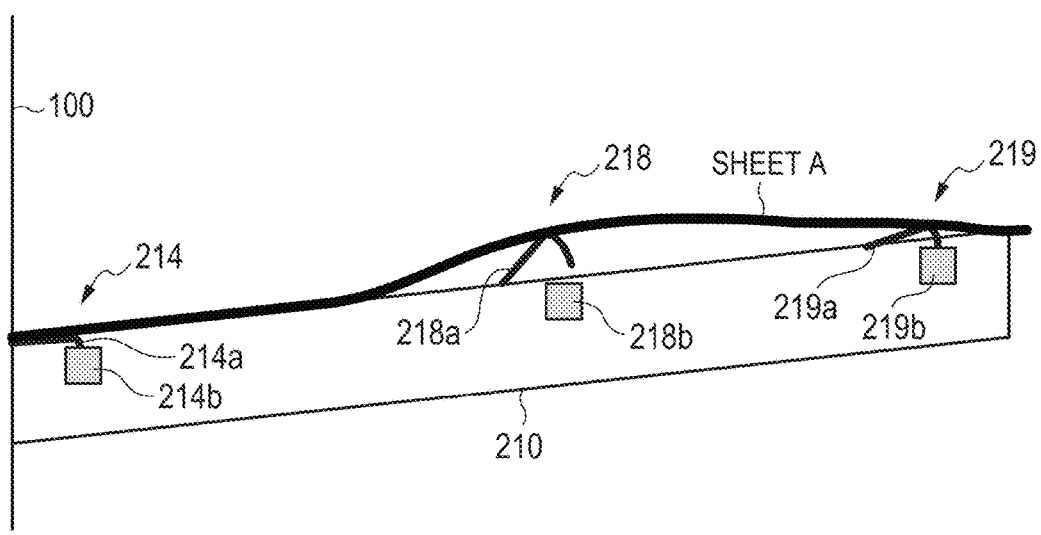
FIG. 7 is a diagram for illustrating a state of a sheet on the manual feed tray according to the first embodiment.

In S811, by referring to the timer, the CPU 301 determines whether or not a predetermined period of time T2 has elapsed. When the CPU 301 determines that the predetermined period of time T2 has not elapsed, the processing of S811 is repeated. In S811, when the CPU 301 determines that the predetermined period of time T2 has elapsed, the processing proceeds to S812. The CPU 301 again determines whether or not the manual feed sheet length sensor 218 outputs the ON signal. In S812, when the CPU 301 determines that the manual feed sheet length sensor 218 outputs the ON signal, the processing proceeds to S806. When the CPU 301 determines that the manual feed sheet length sensor 218 outputs the OFF signal, the processing proceeds to S807. The predetermined period of time T2 in S811 is 3 seconds, which is the same as the predetermined period of time T1. The predetermined period of time T2 is set to a sufficient period of time for resolving a deflection on a sheet A, even if the deflection is generated when the sheet A is stacked on the manual feed tray 210. FIG. 7 illustrates a state in which the deflection is generated on the sheet A when the sheet A is stacked on the manual feed tray 210, and a portion near the center of the sheet A in the conveyance direction is temporality lifted upward from the manual feed tray 210.

The processing of S809 to S812 are carried out in order to detect the following state of the sheet on the manual feed tray 210. FIG. 7 is an enlarged view of a portion of the manual feed tray 210 of the image forming apparatus 100 illustrated in FIG. 2. As illustrated in FIG. 7, the portion near the center of the sheet A set on the manual feed tray 210 may be in the lifted state due to stiffness or the deflection (also referred to as "curl") of the sheet. In the state illustrated in FIG. 7, the flag 214a blocks the light in the photointerrupter 214b, and the manual feed sheet presence sensor 214 is thus turned on. The flag 218a does not block the light in the photointerrupter 218b, and thus the manual feed sheet length sensor 218 outputs the OFF signal. Further, the flag 219a blocks the light in the photointerrupter 219b, and thus the manual feed sheet length sensor 219 outputs the ON signal. In the state illustrated in FIG. 7, the sheet size of the sheet A on the manual feed tray 210 cannot be normally detected. Even if the sheet itself is normally set on the manual feed tray 210, when the manual feed sheet length sensor 218 is defective, and is always outputs the OFF signal, the size of the sheet set on the manual feed tray 210 cannot be normally detected. Even in this state, a case may occur in which the manual feed paper presence sensor 214 outputs the ON signal, the manual feed sheet length sensor 218 outputs the OFF signal, and the manual feed sheet length sensor 219 outputs the ON signal. The control illustrated in FIG. 6 is carried out independently of and in parallel with other control.

Presence or Absence of Normal Detection of Sheet Size

FIG. 8 is a flowchart for illustrating the processing of carrying out display on the operation portion 330, which is based on the flowchart of FIG. 5. In this processing, based on the result of the determination as to whether or not the size detection for the sheet can be normally carried out by using the sensors arranged on the manual feed tray 210 in the processing illustrated in FIG. 6, the display is carried out on the operation portion 330. In this embodiment, in place of the basic flowchart of FIG. 5, the processing may also be carried out by following the flowchart of FIG. 8. In S901, the CPU 301 determines whether or not the manual feed sheet presence sensor 214 outputs the ON signal. When the CPU 301 determines that the manual feed sheet presence sensor 214 outputs the OFF signal, the processing of S901 is repeated. In S901, when the CPU 301 determines that the manual feed sheet presence sensor 214 outputs the ON signal, the CPU 301 determines whether or not the normally detectable flag of the manual feed size, which is the variable of the RAM 303, is set to ON in S902. The normally detectable flag of the manual feed size holds the value set by the processing of S806 or S807 of FIG. 6.

In S902, when the CPU 301 determines that the normally detectable flag of the manual feed size is set to ON, the processing proceeds to S903. The CPU 301 refers to the value of the normally detectable flag of the manual feed size, and determines that the size detection for the sheet can be normally carried out by using the sensors arranged on the manual feed tray 210. The CPU 301 carries out the size detection for the sheet on the manual feed tray 210 by the processing starting from S903. The processing from S903 to S909 of FIG. 8 is the same as the processing from S702 to S708 of the FIG. 5 described above, and description thereof is omitted. When the CPU 301 normally carries out the size detection for the sheet by using the sensors arranged on the manual feed tray 210, the CPU 301 displays the manual feed sheet size display screen 500 of FIG. 4A on the display portion 334 of the operation portion 330 in S909.

In S902, when the CPU 301 determines that the normally detectable flag of the manual feed size is set to OFF, the CPU 301 determines that the size detection for the sheet cannot be normally carried out by using the sensors arranged on the manual feed tray 210. Therefore, the CPU 301 displays the manual feed sheet size designation screen 600 described with reference to FIG. 4B on the display portion 334 of the operation portion 330 in S910. This screen is used to prompt the user to designate the size of the sheet instead of automatically determining the size of the sheet when the size detection for the sheet cannot be normally carried out by using the sensors arranged on the manual feed tray 210.

In this embodiment, the screen to be displayed on the display portion 334 of the operation portion 330 is switched between for a case in which the size detection for the sheet can be normally carried out by using the sensors arranged on the manual feed tray 210 and for the case in which the size detection cannot be normally carried out. In other words, when the size detection for the sheet can be normally carried out, the CPU 301 displays the manual feed sheet size display screen 500 of FIG. 4A on the display portion 334 by the processing of S909 of FIG. 8. When the size detection for the sheet cannot be normally carried out, the CPU 301 displays the manual feed sheet size designation screen 600 of FIG. 4B on the display portion 334 by the processing of S910 of FIG. 8. As a result, according to this embodiment, without spoiling the usability, the image failure or the paper jam caused by the erroneous detection of the sheet size on the manual feed tray 210 can be prevented.

As described above, according to the first embodiment, the image failure or the paper jam caused by the erroneous detection when the sheet size is detected by the manual feed tray can be prevented.

Second Embodiment

Manual Feed Size Detection Alarm Screen

Figure 9:
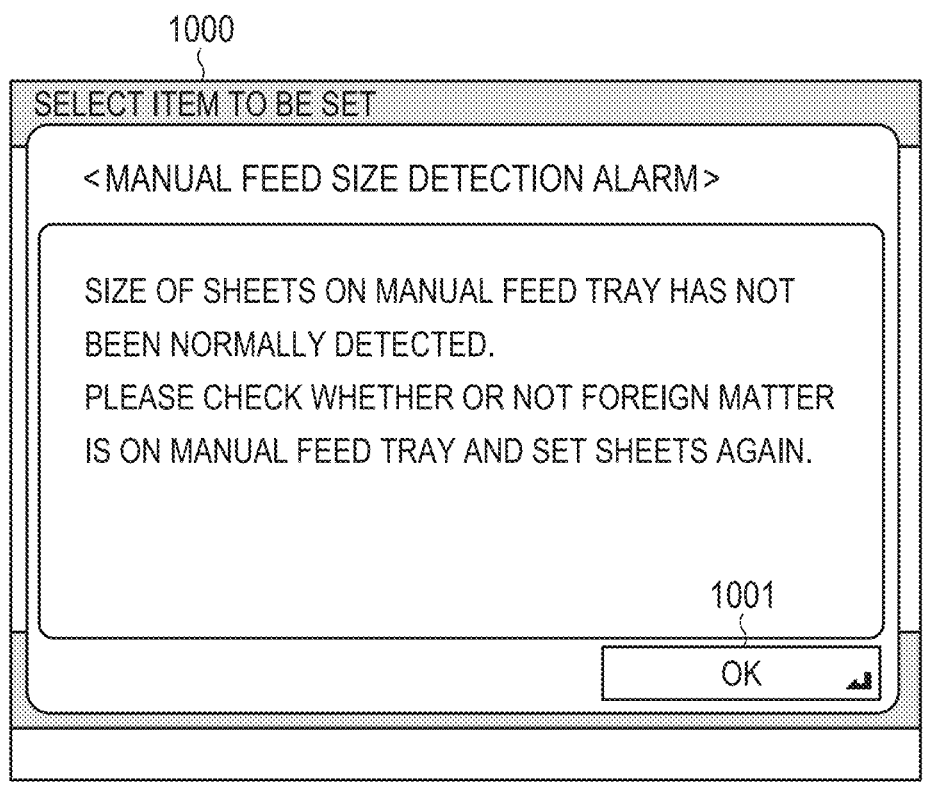
FIG. 9 is a diagram for illustrating a manual feed size detection alarm screen according to the second embodiment.
Figure 10:
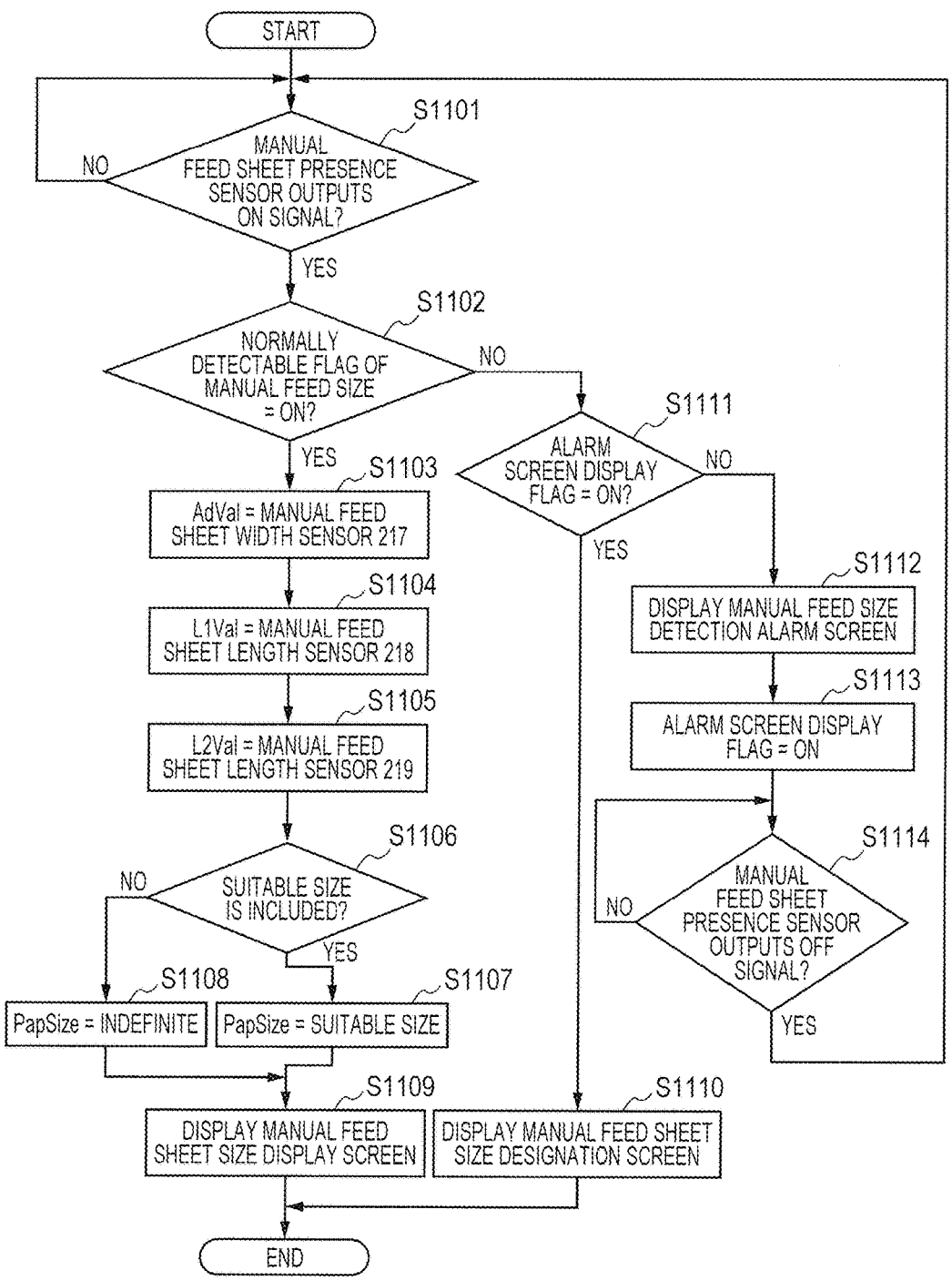
FIG. 10 is a flowchart for displaying the manual feed size detection alarm screen according to the second embodiment.

Referring to FIG. 9 and FIG. 10, the second embodiment is now described. FIG. 9 illustrates a screen for prompting the user to check temporary placement and the like. This screen is displayed when it is determined that the size detection for the sheet on the manual feed tray 210 cannot be normally carried out in the processing described with reference to FIG. 6. In this embodiment, the following cases are assumed as the case in which the size detection for the sheet cannot be normally carried out by the sensors arranged on the manual feed tray 210. A first case is a case in which at least one of the manual feed sheet length sensor 218 and the manual feed sheet length sensor 219 fails. A second case is a case in which a sheet other than the sheet subjected to the printing or an object (hereinafter referred to as "foreign matter") is temporarily placed on the manual feed tray 210. The temporary placement refers to placement of a sheet not to be subjected to copying or printing or an object that changes the state of the sensor arranged in the conveyance direction of the sheet. FIG. 9 illustrates a manual feed size detection alarm screen 1000 which is a third screen, when assuming the second case. Specifically, the temporary placement of a foreign matter on the manual feed tray 210 is assumed, and a screen for prompting the user to check the manual feed tray 210 is displayed. The user removes the foreign matter on the manual feed tray 210, and the sheet is set again. Then, the size detection for the sheet is again carried out by the various sensors arranged on the manual feed tray 210. The user can depress the OK button 1001 to return the display on the display portion 334 of the operation portion 330 from the display of the manual feed size detection alarm screen 1000 to a predetermined display screen.

Display of Manual Feed Size Detection Alarm Screen

FIG. 10 is a flowchart for illustrating processing for carrying out the display of the manual feed size detection alarm screen 1000. The processing from S1101 to S1110 of FIG. 10 is the same as the processing from S901 to S910 of the FIG. 8 described above, and description thereof is omitted. In S1102, when the CPU 301 determines that the normally detectable flag of the manual feed size is set to OFF, the processing proceeds to S1111. The CPU 301 determines that the detection of the sheet size by the sensors arranged on the manual feed tray 210 cannot be normally carried out. In S1111, the CPU 301 determines whether or not the value of the alarm screen display flag stored by the processing of S808 of FIG. 6 is set to ON.

In S1111, when the CPU 301 determines that the alarm screen display flag is set to OFF, the processing proceeds to S1112. The case, in which the normally detectable flag of the manual feed size is set to OFF and the alarm screen display flag is set to OFF, corresponds to a state described below. In the state, the size detection cannot be normally carried out for the first time after the size detection has been normally carried out by using the sensors arranged on the manual feed tray 210, and this state is a first abnormality detection. In S1112, the CPU 301 displays the manual feed size detection alarm screen 1000 described with reference to FIG. 9 on the display portion 334 of the operation portion 330. In S1113, the CPU 301 sets the alarm screen display flag, which is the variable of the RAM 303, to ON, and the processing proceeds to S1114. In the processing of S1113, the CPU 301 stores the fact that the manual size detection alarm screen 1000 is once displayed on the display portion 334. In S1114, the CPU 301 determines whether or not the manual feed sheet presence sensor 214 outputs the OFF signal. When the CPU 301 determines that the manual feed sheet presence sensor 214 does not output the OFF signal, the CPU 301 repeats the processing of S1114. In S1114, when the CPU 301 determines that the manual feed sheet presence sensor 214 outputs the OFF signal, namely, the sheet has been removed from the manual feed tray 210, the processing returns to S1101.

In S1111, when the CPU 301 determines that the alarm screen display flag is set to ON, the CPU 301 determines that, after the size detection could not normally be carried out, the manual feed size detection alarm screen 1000 has once been displayed on the operation portion 330. The CPU 301 does not display the manual feed size detection alarm screen 1000 on the display portion 334, and the processing proceeds to S1110. In this embodiment, when the CPU 301 determines that the size of the sheet cannot be normally detected by using the sensors arranged on the manual feed tray 210, the CPU 301 only once displays the manual size detection alarm screen 1000 on the display portion 334.

Only when the alarm screen display flag is set to OFF by the processing of S808 of FIG. 6, the CPU 301 carries out the following processing. Specifically, after the CPU 301 determines that the size detection can be normally carried out, or after the three sensors arranged on the manual feed tray 210 can no longer detect the sheet, when the CPU 301 determines that the size detection is abnormal for the first time, the CPU 301 displays the manual feed size detection alarm screen 1000 on the operation portion 330. As a result, when a foreign matter is temporarily placed on the manual feed tray 210, the CPU 301 appropriately prompts the user to check the manual feed tray 210. Then, the size detection for the sheet can be normally carried out. In a case in which at least one of the manual feed sheet length sensor 218 and the manual feed sheet length sensor 219 fails, the display of the manual feed size detection alarm screen 1000 is not repeated. As a result, the usability is prevented from being spoiled.

As described above, according to the second embodiment, the image failure or the paper jam caused by the erroneous detection when the sheet size is detected by the manual feed tray can be prevented.

Third Embodiment

Selection of Screen

Figure 11:
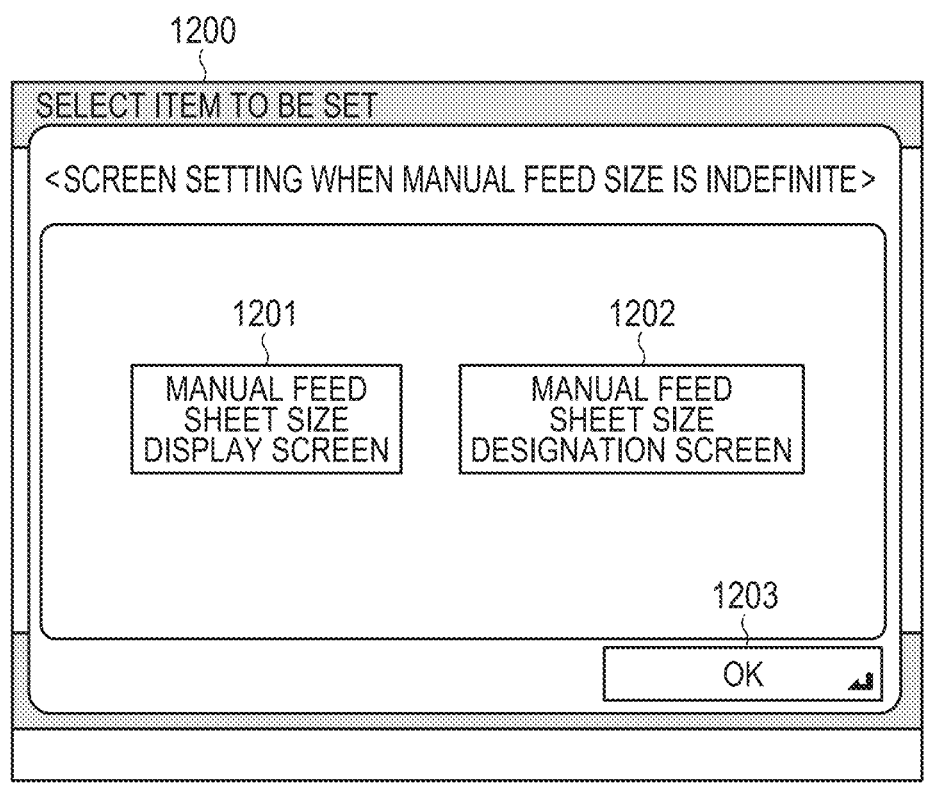
FIG. 11 is a diagram for illustrating a screen setting screen when a manual feed size is indefinite according to a third embodiment of the present invention.
Figure 12:
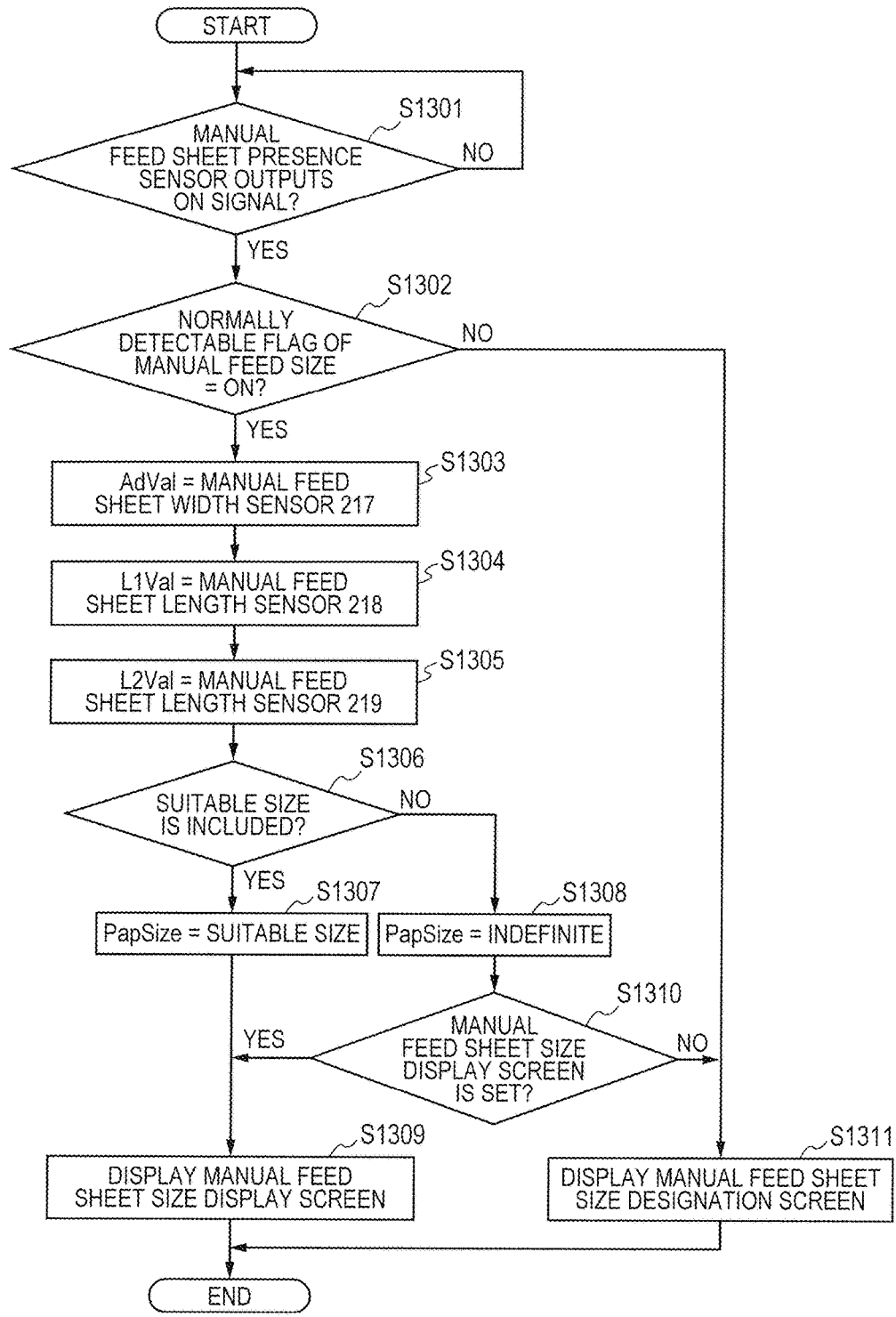
FIG. 12 is a flowchart for displaying a screen setting screen when a manual feed size is indefinite according to the third embodiment.

Referring to FIG. 11 and FIG. 12, a third embodiment of the present invention is now described. FIG. 11 illustrates a screen displayed on the display portion 334 when the sheet size is determined to be indefinite after the size detection for the sheet is carried out by the sensors arranged on the manual feed tray 210. The screen of FIG. 11 is displayed when the CPU 301 determines that the sheet size is indefinite. This screen functions as a selecting unit configured to select, in advance, which of the manual feed sheet size display screen 500 and the manual feed sheet size designation screen 600 is to be displayed on the display portion 334 of the operation portion 330. A screen setting screen 1200 for selecting, in advance, the screen displayed when the sheet size on the manual feed tray 210 is indefinite includes two selection buttons. Specifically, the screen setting screen 1200 includes a selection button 1201 for selecting the manual feed sheet size display screen 500 and a selection button 1202 for selecting the manual feed sheet size designation screen 600. The user depresses any one of the selection buttons 1201 and 1202, to thereby select any one of the screens to be displayed in advance. After any one of the selection buttons 1201 and 1202 is depressed, an OK button 1203 on the screen setting screen 1200 when the sheet size on the manual feed tray 210 is indefinite is depressed. As a result, which of the screens is to be displayed is determined. This screen setting screen 1200 is displayed in response to the depression of the user setting button 336 on the operation portion 330.

Processing when Sheet Size on Manual Feed Tray is Indefinite

FIG. 12 is a flowchart for illustrating processing for carrying out the display switching. This processing is carried out by following the screen selected on the screen setting screen 1200 when the sheet size is determined to be indefinite in the size detection for the sheet by the sensors arranged on the manual feed tray 210. The processing from S1301 to S1308 of FIG. 12 is the same as the processing from S901 to S908 of the FIG. 8 described above, and description thereof is omitted. In S1308, the CPU 301 stores information (such as "indefinite") representing that the sheet size is indefinite as PapSize which is the variable in the RAM 303. The CPU 301 determines which of the settings of the screen is made in advance (S1310). The setting is made on the screen setting screen 1200 when the sheet size on the manual feed tray 210 is determined to be indefinite, which is illustrated in FIG. 11.

The CPU 301 determines the content to be displayed on the operation portion 330 according to the setting made in advance. The setting is made on the screen setting screen 1200 when the sheet size on the manual feed tray 210 is determined to be indefinite. When the manual feed sheet size display screen 500 is set on the screen setting screen 1200 (YES in S1310), the processing proceeds to S1309.

When the manual feed sheet size designation screen 600 is set on the screen setting screen 1200 (NO in S1310), the processing proceeds to S1311. In S1309, the CPU 301 displays the manual feed sheet size display screen 500 of FIG. 4A on the display portion 334 of the operation portion 330 based on the sheet size stored as the PapSize, which is the variable in the RAM 303, and finishes the processing. In S1311, the CPU 301 displays the manual feed sheet size designation screen 600 of FIG. 4B on the display portion 334 of the operation portion 330, and finishes the processing. Information of the sheet size designated on the manual feed sheet size designation screen 600 of FIG. 4B is stored in an area, for example, in the RAM 303, different from the area for the detection results (S1303 to S1305) obtained by the sensors arranged on the manual feed tray 210. The information of the designated sheet size stored in the RAM 303 or the like is maintained until the sheet size is designated on the manual feed sheet size designation screen 600 next time.

In the first and second embodiments, when the size of the sheet on the manual feed tray 210 is indefinite, the manual feed sheet size display screen 500 is displayed (S908 and S909 of FIG. 8, and S1108 and S1109 of FIG. 10). In this embodiment, the setting is made in advance on the screen setting screen 1200 of FIG. 11. When the size of the sheet on the manual feed tray 210 is determined to be indefinite, according to the made setting, any one of the manual feed sheet size display screen 500 and the manual feed sheet size designation screen 600 is displayed. As a result, according to this embodiment, the usability can be increased.

As described above, according to the third embodiment, the image failure or the paper jam caused by the erroneous detection when the sheet size is detected by the manual feed tray can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-207387, filed Oct. 8, 2014, which is hereby incorporated by reference herein in its entirety.

What is claimed is:

1. An image forming apparatus, comprising:
    a manual feed tray on which a recording material is to be manually stacked;
    a first detector configured to detect a presence or absence of the recording material on the manual feed tray;
    a second detector arranged on an upstream side of the first detector in a conveyance direction of the recording material, the second detector configured to detect a presence or absence of the recording material on the manual feed tray;
    a third detector arranged on an upstream side of the second detector in the conveyance direction of the recording material, the third detector configured to detect a presence or absence of the recording material on the manual feed tray;
    a fourth detector configured to detect a length of the recording material on the manual feed tray in a direction orthogonal to the conveyance direction;
    a display portion configured to display information; and
    a controller configured to determine a size of the recording material based on detection results of the first detector, the second detector, the third detector and the fourth detector, and causing the display portion to display a first screen displaying the determined size of the recording material,
    wherein the controller causes the display portion to display a second screen for designating the size of the recording material, when, among the first detector, the second detector and the third detector, a detection result of a downstream-side detector located on a downstream side in the conveyance direction does not detect the presence of the recording material and a detection result of an upstream-side detector located on an upstream side of the downstream-side detector in the conveyance direction does detect the presence of the recording material.

2. An image forming apparatus according to claim 1, wherein the controller causes the display portion to display the second screen, when a detection result of the first detector and the third detector detect the presence of the recording material and a detection result of the second detector does not detect the presence of the recording material.

3. An image forming apparatus according to claim 1, wherein the controller causes the display portion to display the second screen, when a detection result of the first detector does not detect the presence of the recording material and a detection result of the second detector detects the presence of the recording material.

4. An image forming apparatus according to claim 1, wherein, when the controller causes the display portion to display the second screen after causing the display portion to display the first screen, the controller causes the display portion to display a third screen for prompting replacement of the recording material stacked on the manual feed tray before causing the display portion to display the second screen.

5. An image forming apparatus according to claim 1, wherein the controller causes the display portion to display the first screen, when, among a detection result of the first detector, the second detector and the third detector, the a detection result of downstream-side detector located on the downstream side in the conveyance direction does detect the presence of the recording material and a detection result of the upstream-side detector located on the upstream side of the downstream-side detector in the conveyance direction does not detect the presence of the recording material.

6. An image forming apparatus according to claim 1, wherein the controller causes the display portion to display the first screen, when a detection result of all of the first detector, the second detector and the third detector detect the presence of the recording material.

7. An image forming apparatus according to claim 5, wherein the controller is configured to determine the size of the recording material, based on the detection results of the first detector, the second detector, the third detector and the fourth detector, and on information associating the size of the recording material with the detection results of the first detector, the second detector, the third detector and the fourth detector.

8. An image forming apparatus according to claim 7, further comprising, a selector for previously selecting which of the first screen and the second screen is to be displayed on the display portion when controller determines that the size of the recording material is indefinite,
   wherein the controller causes the display portion to display one of the first screen and the second screen selected by the selector, when the size of the recording material is determined to be indefinite.

9. An image forming apparatus according to claim 1, wherein:
   the manual feed tray has regulating plates configured to regulate both end portions of the recording material in the direction orthogonal to the conveyance direction; and
   the fourth detector is configured to output a value corresponding to positions of the regulating plates in conjunction with an operation of the regulating plates.

* * * * *